United States Patent
Gasami et al.

[11] Patent Number: 5,819,806
[45] Date of Patent: Oct. 13, 1998

[54] CHANNEL HOUSING WITH CURVING CHANNELS, AND A MANUFACTURING METHOD THEREFOR

[75] Inventors: Shinji Gasami, Aki-gun; Yoshifumi Iwata, Kure; Yoshihiro Takemoto, Higashihiroshima; Shoso Nishida, Hiroshima, all of Japan

[73] Assignees: Daikyo Co., Ltd., Hiroshima-Ken; The Japan Steel Works, Ltd., Tokyo, both of Japan

[21] Appl. No.: 886,843

[22] Filed: Jul. 1, 1997

Related U.S. Application Data

[63] Continuation of Ser. No. 368,202, Dec. 29, 1994, abandoned.

[30] Foreign Application Priority Data

Dec. 29, 1993 [JP] Japan .................................. 5-349797
Dec. 29, 1993 [JP] Japan .................................. 5-349901

[51] Int. Cl.⁶ ......................................................... F16L 9/18
[52] U.S. Cl. ........................... 138/111; 138/115; 138/117; 138/157
[58] Field of Search ................................. 138/111, 177, 138/178, 157, 115–117; 425/116; 264/248, 262; 249/123; 164/351, 350, 361

[56] References Cited

U.S. PATENT DOCUMENTS

| | | | |
|---|---|---|---|
| 1,348,390 | 8/1920 | Claus | 138/111 |
| 2,871,887 | 2/1959 | Obrebski et al. | 138/111 |
| 3,135,290 | 6/1964 | Carls | 138/111 X |
| 3,173,451 | 3/1965 | Slayter | 138/111 X |
| 3,672,441 | 6/1972 | Wells et al. | 249/123 X |
| 4,290,736 | 9/1981 | Bernasconi | 138/111 X |

FOREIGN PATENT DOCUMENTS

| | | |
|---|---|---|
| 63-14071 | 1/1988 | Japan . |
| 63-237917 | 10/1988 | Japan . |
| 63-237918 | 10/1988 | Japan . |
| 2-20410 | 3/1990 | Japan . |
| 2-38377 | 7/1990 | Japan . |

*Primary Examiner*—Patrick F. Brinson
*Attorney, Agent, or Firm*—Merchant, Gould, Smith, Edell, Welter & Schmidt

[57] ABSTRACT

The present invention provides a channel housing comprising curving channels whereby complex and varied channels can be compactly contained.

Plural curving channels that must be connected to plural valves, for example, are formed by partitioning walls forming curving channels inside a pair of symmetrical housing halves, which are then bonded together to form the complex channel system.

The housing halves may be joined by welding or adhesive bonding. To improve the bonding strength, a pair of opposing channel members is provided along the length of the contacting members that are welded or bonded. The cavity formed by the opposing channel members D, D is then filled with an adhesive resin M to integrate the two halves.

7 Claims, 20 Drawing Sheets

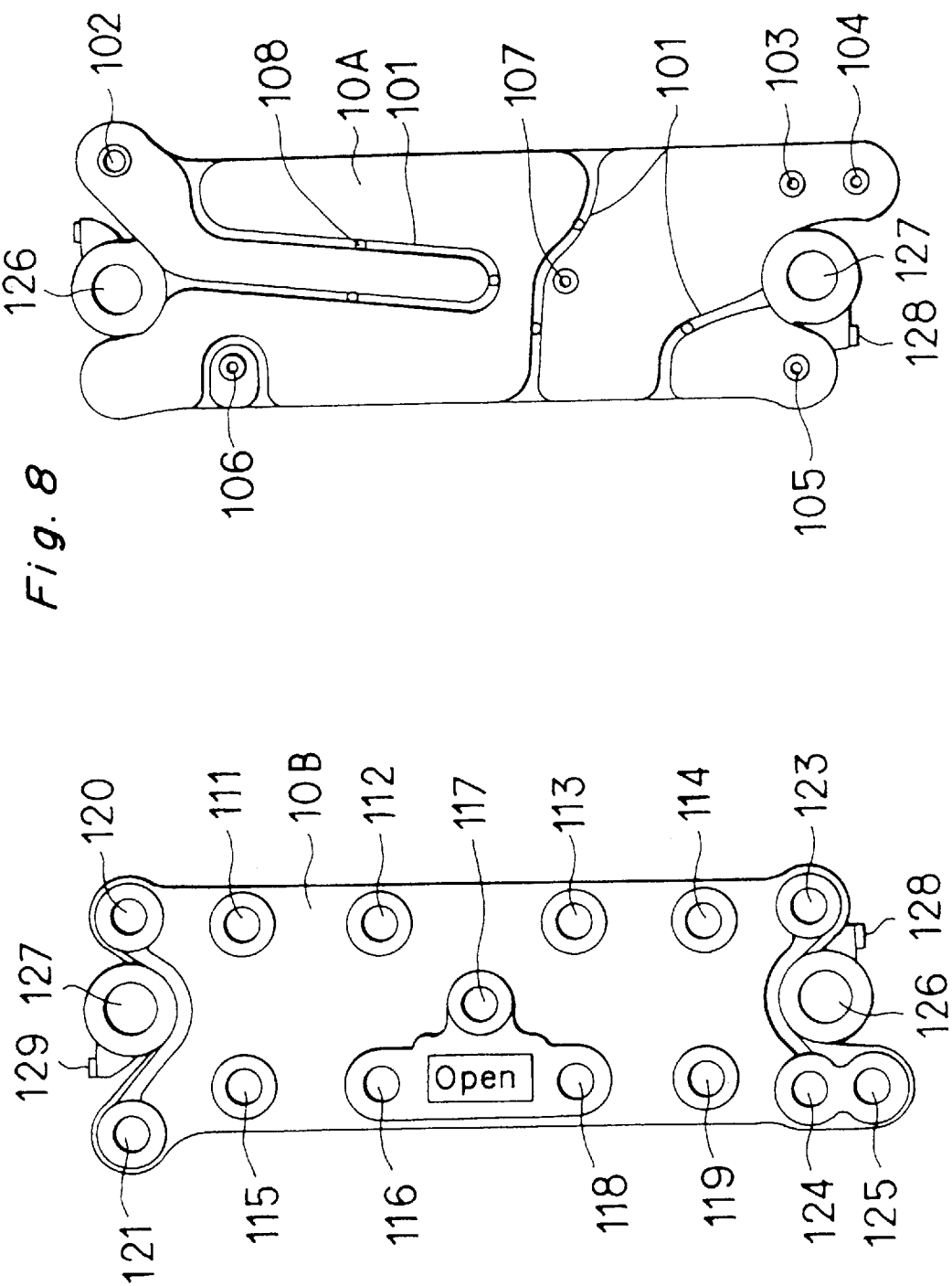

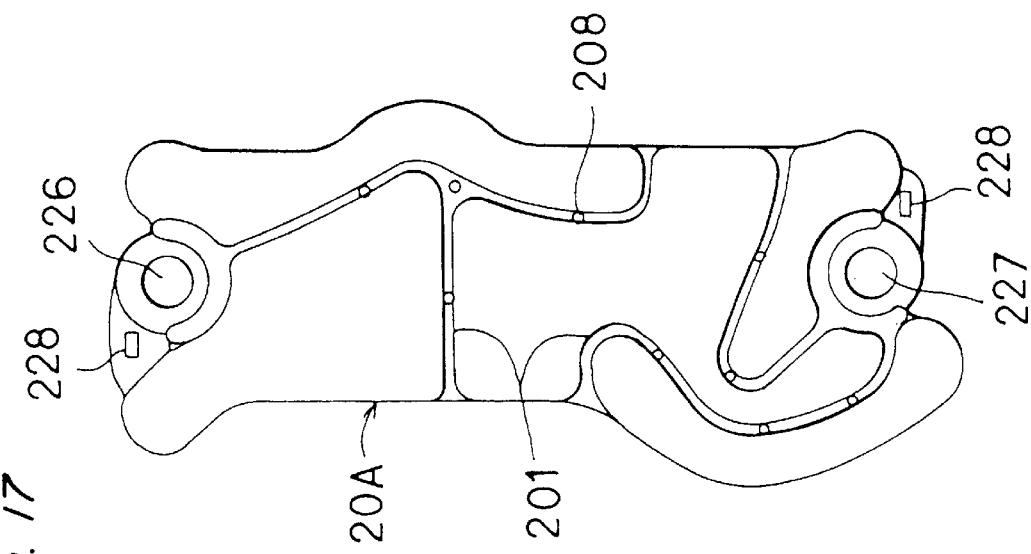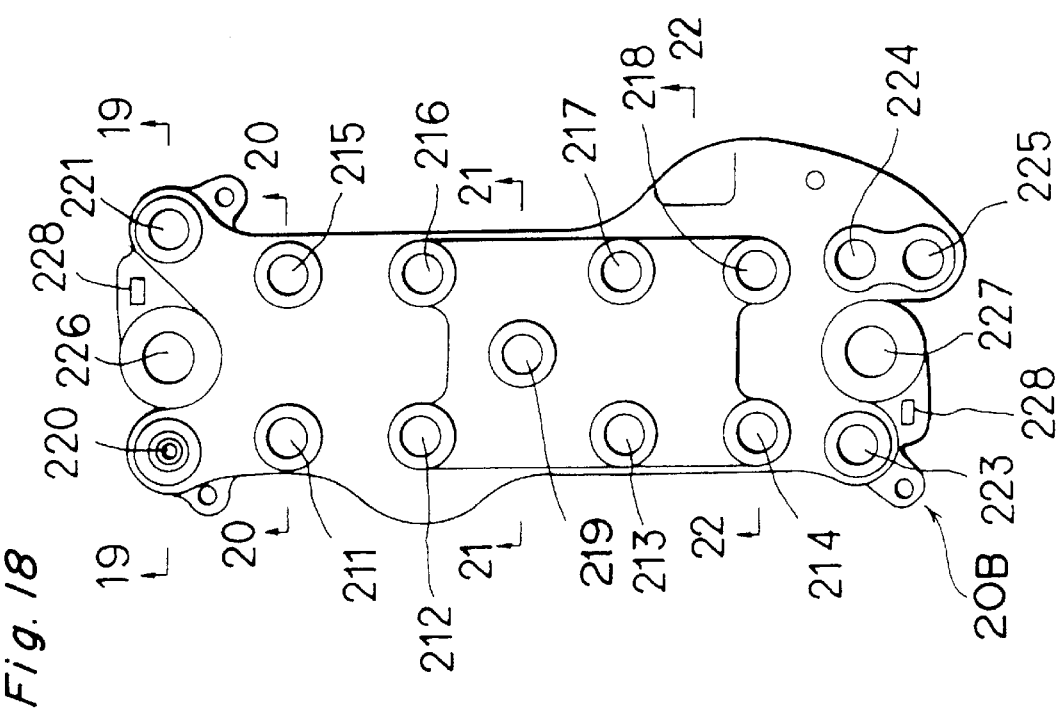

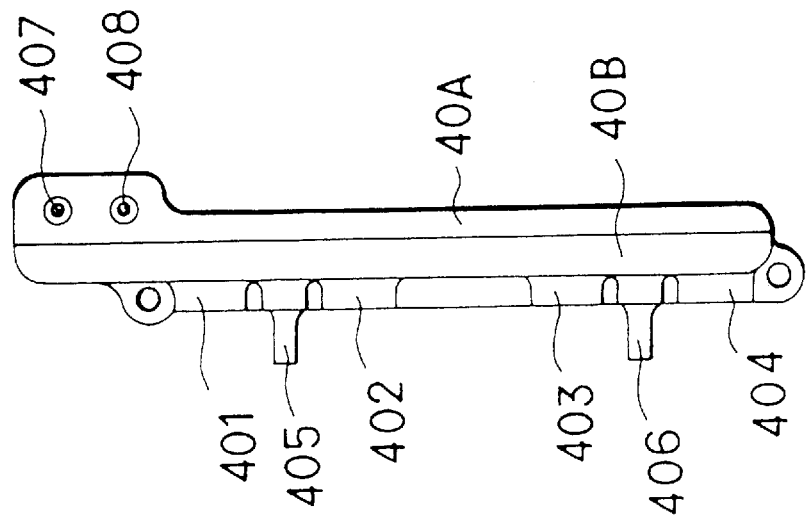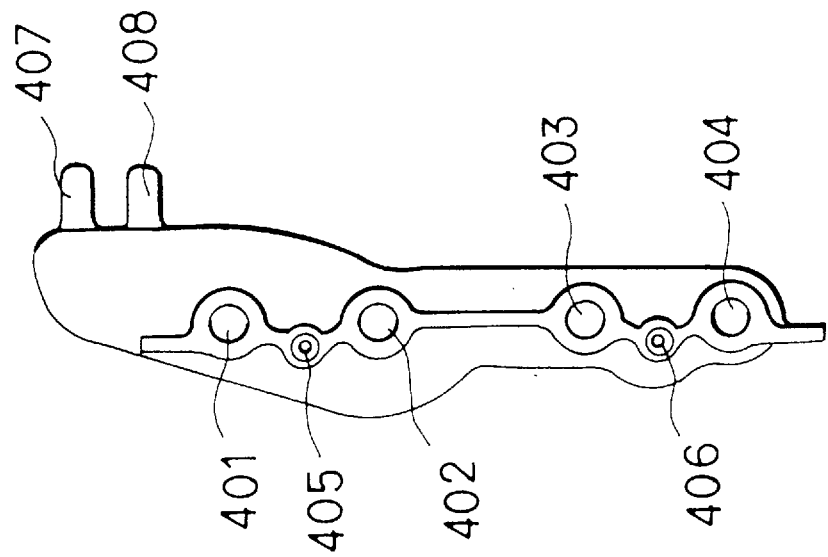

Fig. 34A First step (Upper half)
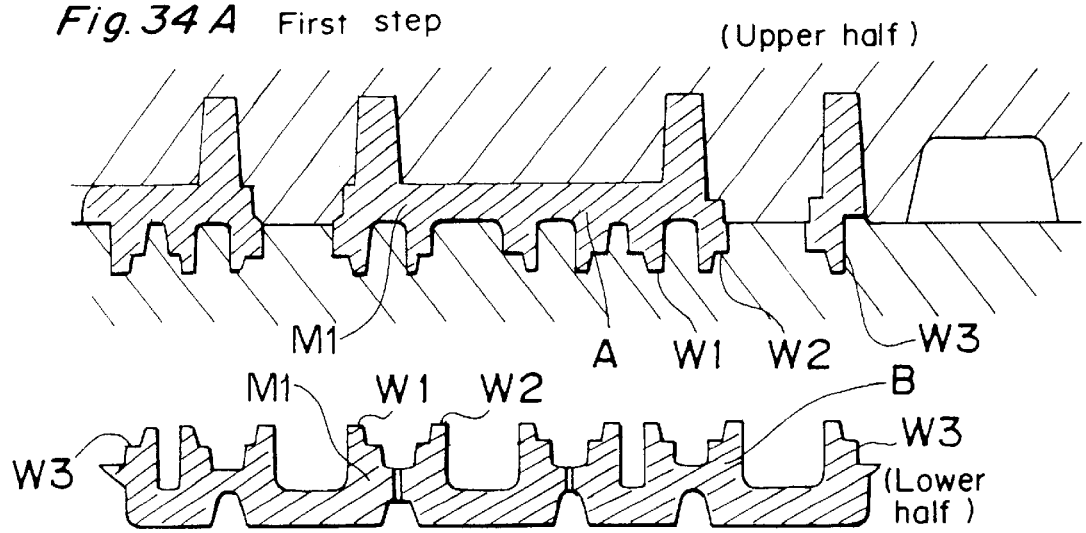
Fig. 34B (Second step)
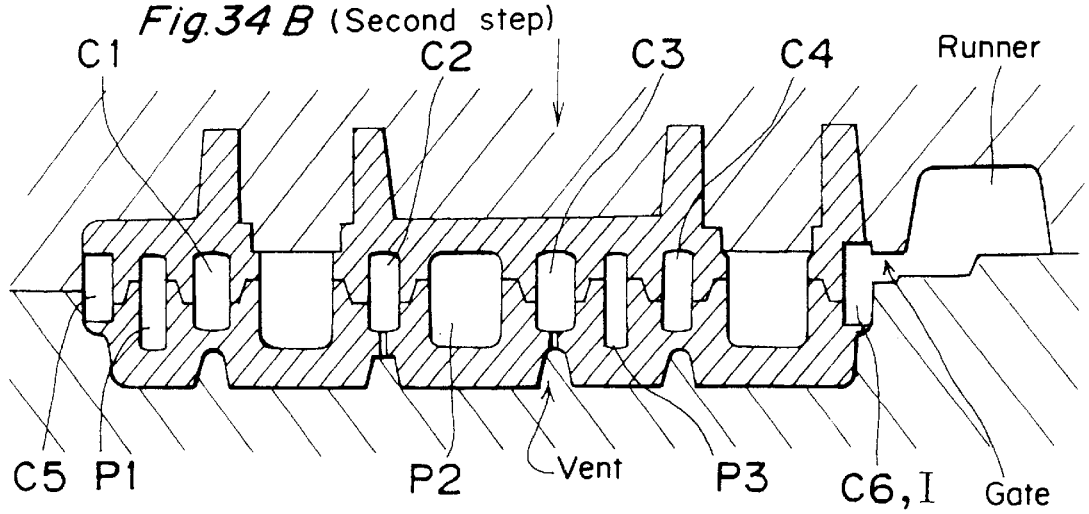
Fig. 34C (Third step)
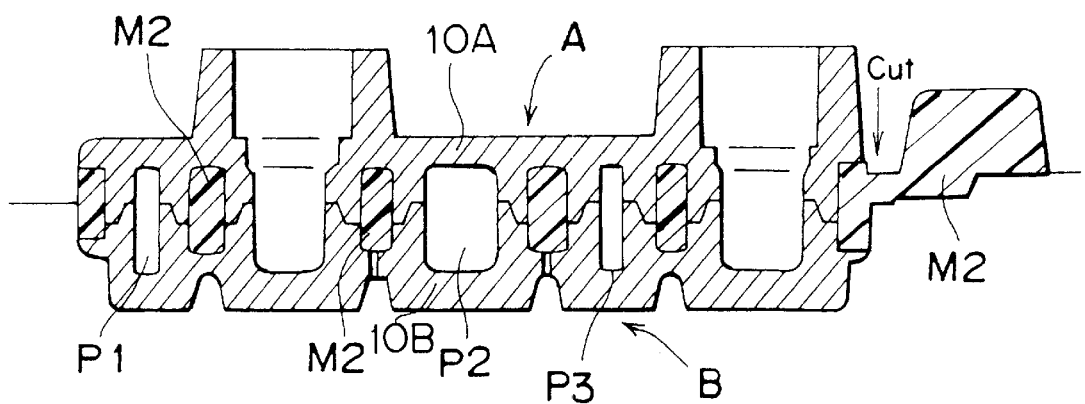

CHANNEL HOUSING WITH CURVING CHANNELS, AND A MANUFACTURING METHOD THEREFOR

This is a Continuation of application Ser. No. 08/368,202, filed Dec. 29, 1994 now abandoned.

BACKGROUND OF THE INVENTION

The present invention relates to a channel housing used in channel systems comprising channels curving in plural branches, and to a manufacturing method therefor.

In general, any kind of complex channel system will require channels curving in plural branches. Assembly becomes accordingly complicated, the system more susceptible to breakdowns, and the volume of the housing holding the piping larger, making it impossible to achieve a compact channel system.

For example, engines using a so-called "sequential twin turbo system" are used as a means of providing high performance automotive engines. Normally, a map describing the operating range for the secondary turbocharger is provided as a function of the throttle opening and engine speed, and turbocharging is switched according to this map. As a result, the control solenoids and other aspects of the channels become complex and extremely varied, making installation in the confines of the engine room difficult, and increasing both weight and cost.

The negative pressure piping check valve used in channel systems used for engine control as described above has been previously proposed in Japanese Patent Jikkaisho No. 14071/1988. However, this does not provide a means for making the overall channel system more compact.

It therefore remains necessary to construct the overall channel system as compactly and light weight as possible when it is necessary to assemble a complex and varied channel system or similar assembly providing the control described above in an engine room or similarly confined space. Resolving this problem will also address various correlated concerns, including making assembly easier, and improving the reliability of the channel system.

Therefore, the first object of the present invention is to provide a housing comprising curving channels whereby complex and varied channels can be included compactly.

A further object of the invention is to provide a method for manufacturing a housing comprising curving channels by forming a plurality of mutually opposing partitions for forming said curving channels on the insides of a pair of molded bodies, and then bonding said partitions together. There are cases, however, when simply welding or bonding the bonding edges of the partitions is not sufficient to obtain adhesion strength exceeding a certain level.

Currently, methods for bonding a pair of molded bodies to form a hollow body have been proposed in Japanese patents Tokkaisho Nos. 63-237917 (1988) and 63-23918 (1988); Tokkaihei No. 2-20410 (1990); and Tokkouhei No. 2-38377 (1990). Each of these methods, however, involves bonding only the outside circumference of the molded body pair, and is not suited to bonding partitions for forming curving channels formed on the inside of molded bodies, as is necessary in a housing comprising curving channels.

Therefore, the second object of the present invention is to provide a method for manufacturing a housing comprising curving channels wherein strong bonds are formed between inside members.

SUMMARY OF THE INVENTION

If piping that must be connected to a plurality of valves is formed by means of curving channels that are defined by partitions, it is possible to construct a complex channel system by forming these partitions in a pair of molded bodies, and then bonding the partitions in opposing molded bodies together. It is thereby possible to achieve the first object of the invention.

Therefore, the first embodiment of the present invention is a channel housing comprising curving channels manufactured by bonding a pair of molded bodies A and B of which the insides are open and the outsides are closed to form a box-shaped housing comprising a plurality of curving channels P for conducting a fluid internally.

This channel housing is characterized by the molded bodies A and B comprising an internal surface configuration of plural symmetrically shaped curving channels P, and an outside surface configuration comprising plural external connecting pipes or connection ports H continuous to the curving channels P. This channel housing is further characterized by said internal surface configuration being formed by bonding walls J rising perpendicularly from the inside surfaces of the molded bodies and partitioning plural mutually opposed curved closed loops, said opposing bonding walls J being bonded together with the wall edges thereof in mutual contact, thus forming curving channels P enclosed by a pair of closed loops inside the housing.

By means of this first embodiment, when a pair of molded bodies A and B in which bonding walls J (shaded areas) partitioning curving channels 11, 12, 13, and 14 as shown in FIG. 4 are bonded at the top edges of the bonding walls J, a housing 10 comprising internal curving channels corresponding to curving channels 11, 12, 13, and 14 is formed.

When a channel system such as shown in FIG. 1 and FIG. 32 is built using plural housings comprising such curving channels, the channel designs of housings 10, 20, 30, and 40, shown in FIGS. 4, 5, 6, and 7, respectively, are developed based on the valve channel system shown in FIG. 32 to connect connector pipes 1-1 to 8-1, 1-2 to 8-2, and 1-3 to 8-3 of three-way solenoid valves SV-1–SV-8, which conduct in the directions of arrows ON and OFF. Next, as shown in FIG. 1, plural valves are disposed by connecting the connector ports of the bottom housing 20 sequentially to the connecting pipes 1-2 to 8-2 projecting from the bottoms of solenoid valves SV1–SV8, and then connecting the top housing 10 to the connecting pipes 1-1 to 8-1 projecting from the tops of the solenoid valves. By similarly connecting the connector ports of the side housings 30 and 40 to the connecting pipes 1-3 to 8-3 projecting to the sides of solenoid valves SV1–SV8, the complete channel assembly task is completed. See FIG. 2, a cross section of A—A in FIG. 1, and FIG. 3, a cross section of B—B in FIG. 1.

Therefore, by means of a channel housing comprising curving channels according to the present invention, it is possible by simplifying the structure of a channel system comprising complex channels in plural parts to dispose said channel system in a compact assembly. As a result, assembly to the engine is simplified, assembly errors are eliminated, misoperation does not occur, and the reliability of engine control can be improved. This structural simplification also enables a reduction in overall production costs, and a reduction in housing weight. An engine control assembly as shown in FIG. 1 is described in detail in the preceding Japanese Patent Ser. No. 5-349806 of the present inventor. This reference patent application is incorporated into the present application by this specific reference thereto.

Bonding the above pairs of molded bodies may be accomplished by either welding or adhesive bonding. Usable welding methods include such known techniques as frictional oscillation welding, ultrasonic vibration welding, and hot plate plastic welding (described, for example, in Japanese patent Tokkaisho 63-237918). Adhesive bonding methods include the use of commercially available silicon or epoxy adhesive agents when the moldings are made from Nylon 6; when the moldings are made from ABS resin, a variety of other adhesive agents may be used in addition to the above adhesives. However, to improve the strength and airtightness of the bonds, it is preferable that the bonding walls J forming adjacent curving channels P in the pair of molded bodies comprise a channel member, which may be filled with adhesive resin M for bonding. Note that the bonding walls J may be formed by adjacent partitioning walls W, W.

Therefore, the second embodiment of the present invention achieves the second object of the invention by using the above preferred bonding methods. This is a method for manufacturing a channel housing comprising plural curving channels P for conducting a fluid internally, and connector ports H for external connection, which comprises; a first step of forming a pair of molded bodies A and B; a second step of butt-joining said molded bodies A and B; and a third step of bonding the butt-jointed pair of molded bodies A and B.

In this method a channel member for injection of an adhesive resin to the bonding surfaces is formed in the butt-jointed and bonded partitions, and the adhesive resin is injected thereto for bonding the pair of molded bodies.

This manufacturing method is further characterized by: a first step of forming partitions W, which rise perpendicularly to the inside surface of each molded body for partitioning the plural closed loops forming the curving channels, and forming a channel member D between adjacent partitions W, W; a second step of butt-joining the mutually opposing partitions W in the pair of molded bodies to form adhesive cavities C within the pair of opposing channel members D, D; and a third step of injecting a secondary resin M to the adhesive cavities C of the pair of butt-jointed molded bodies to bond the partitions W, and thereby integrate the pair of molded bodies.

Methods for injecting or filling this secondary resin M to the adhesive cavities C formed by the channel members D, D include the die slide injection method (see Japanese Patent Tokkouhei 02-38377), and die manipulation methods (see Japanese Patent Tokkaisho 63-237917).

When the partitions are formed as shown in FIG. 33 such that partitions W1 and W2 forming curving channels P1, P2, P3, and P4 on the inside of the pair of molded bodies A and B are formed continuous to partition W3 forming the outside part of the molded bodies, channel member D formed by partitions W1 and W2 can be continuous to an external gate (not shown in the figures) by means of injection ports I-1, I-2 and I-3, thereby simplifying injection of the secondary resin. Integration of the molded bodies by means of adhesive bonding is thus simplified. Note that the external connector ports H are also shown in FIG. 33.

By means of the second embodiment described above and as shown in FIG. 34, a pair of molded bodies A and B is formed from a first resin M1 in the first step (FIG. 34 (A)); continuous adhesive cavities C1–C4 comprising a secondary resin injection ports I and open to circumference adhesion members C5 and C6 of the pair of molded bodies are formed by abutting the channel members D, D in the second process (FIG. 34(B)); and finally, a secondary resin M2 supplied from a runner is injected from gate G continuous to the injection port I into the adhesive cavities C1–C4 simultaneously to circumference adhesion members C5 and C6 in the third step (FIG. 34(c)), thereby bonding the molded bodies 10A and 10B. Accordingly, the bond members therefore have a sufficient adhesion area for contact with the secondary resin, and have curving channels with excellent adhesion strength. Further, housings comprising complex channel systems can also be mass produced with a two-step molding method. Note that the runner is cut off after mold removal.

Note, further, that while circumference adhesion member C5 of the molded body has a C-shaped cross section as shown in FIG. 34, if it is formed with an O-shaped cross section as shown in FIG. 35 similarly to the adhesion members of the curving channel partitions, the contact area for the secondary resin M2 will increase, and adhesion strength will therefore increase. In addition, cooling of the secondary resin M2 flowing into the adhesive cavities during resin injection will be retarded, and problems caused by insufficient resin filling will be prevented.

BRIEF DESCRIPTION OF THE DRAWINGS

The present invention will become more fully understood from the detailed description given below and the accompanying diagrams wherein:

FIGS. 8 and 9 are a top view and a back view, respectively, of the top channel housing 10 shown in FIG. 4;

FIGS. 17 and 18 are back and top views, respectively, of the bottom channel housing 20 shown in FIG. 5;

FIGS. 30 and 31 are a top view and an internal side view, respectively, of the right side channel housing 40 shown in FIG. 7;

FIGS. 34A–34C are cross sections showing the processes of the manufacturing method according to the present invention.

DETAILED DESCRIPTION OF THE INVENTION

The preferred embodiments of the present invention shown in the appended figures are described below with reference to the figures.

Figure 1:
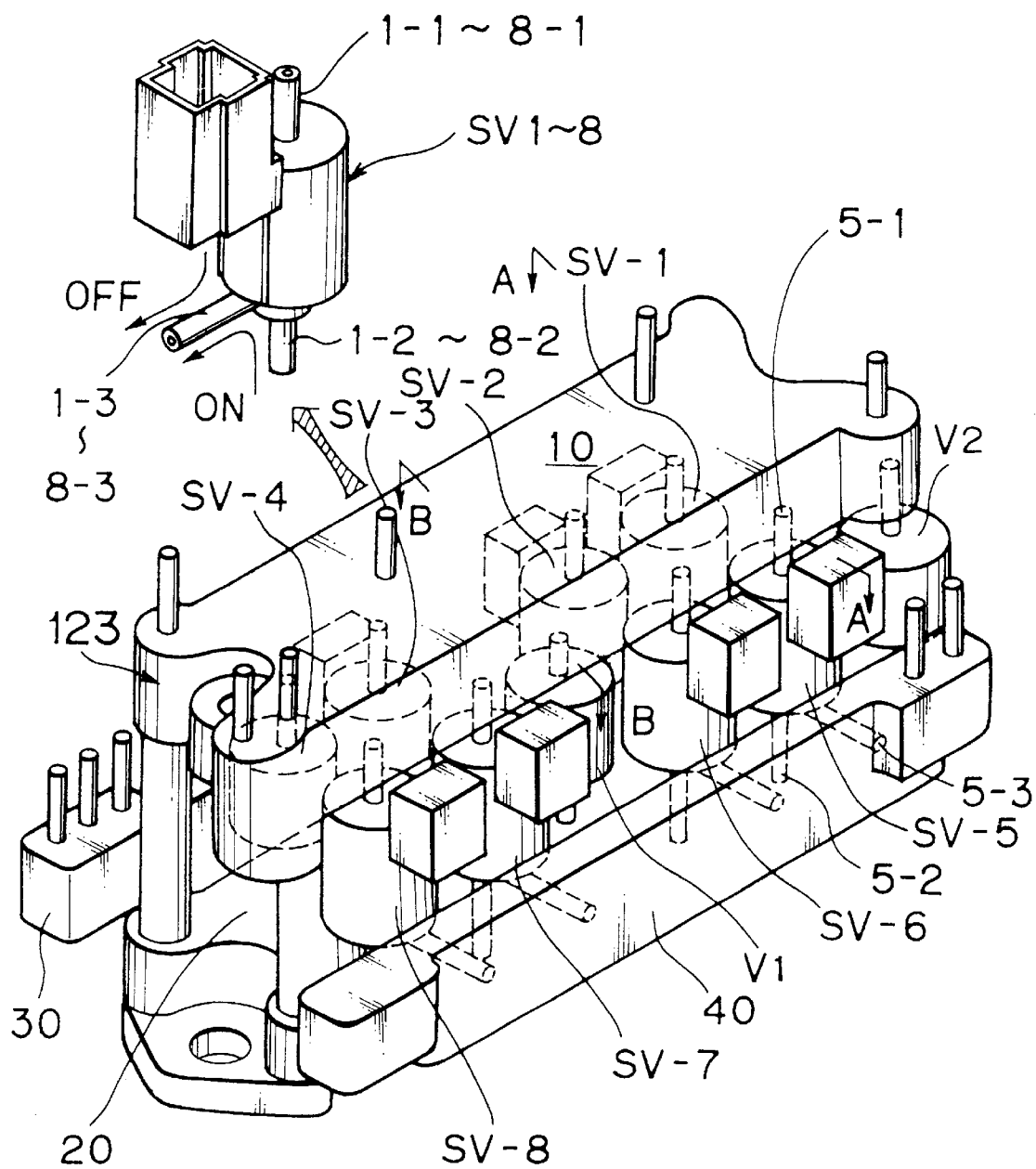
FIG. 1 is a perspective view of the present invention.
Figure 2:
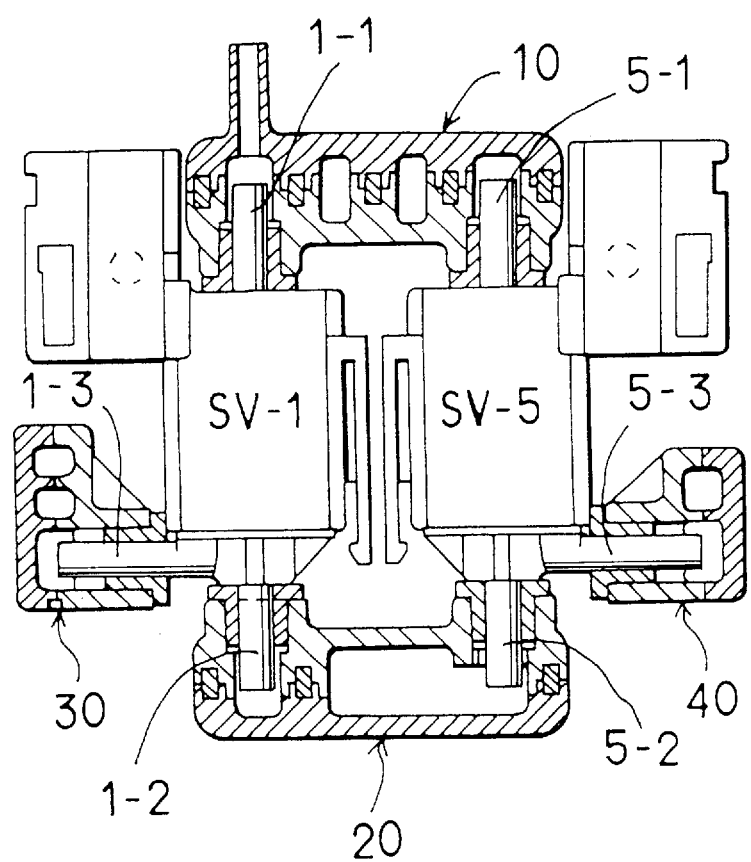
FIGS. 2 and 3 are cross sections of the engine control assembly shown in FIG. 1 at lines A—A and B—B, respectively, therein.
Figure 32:
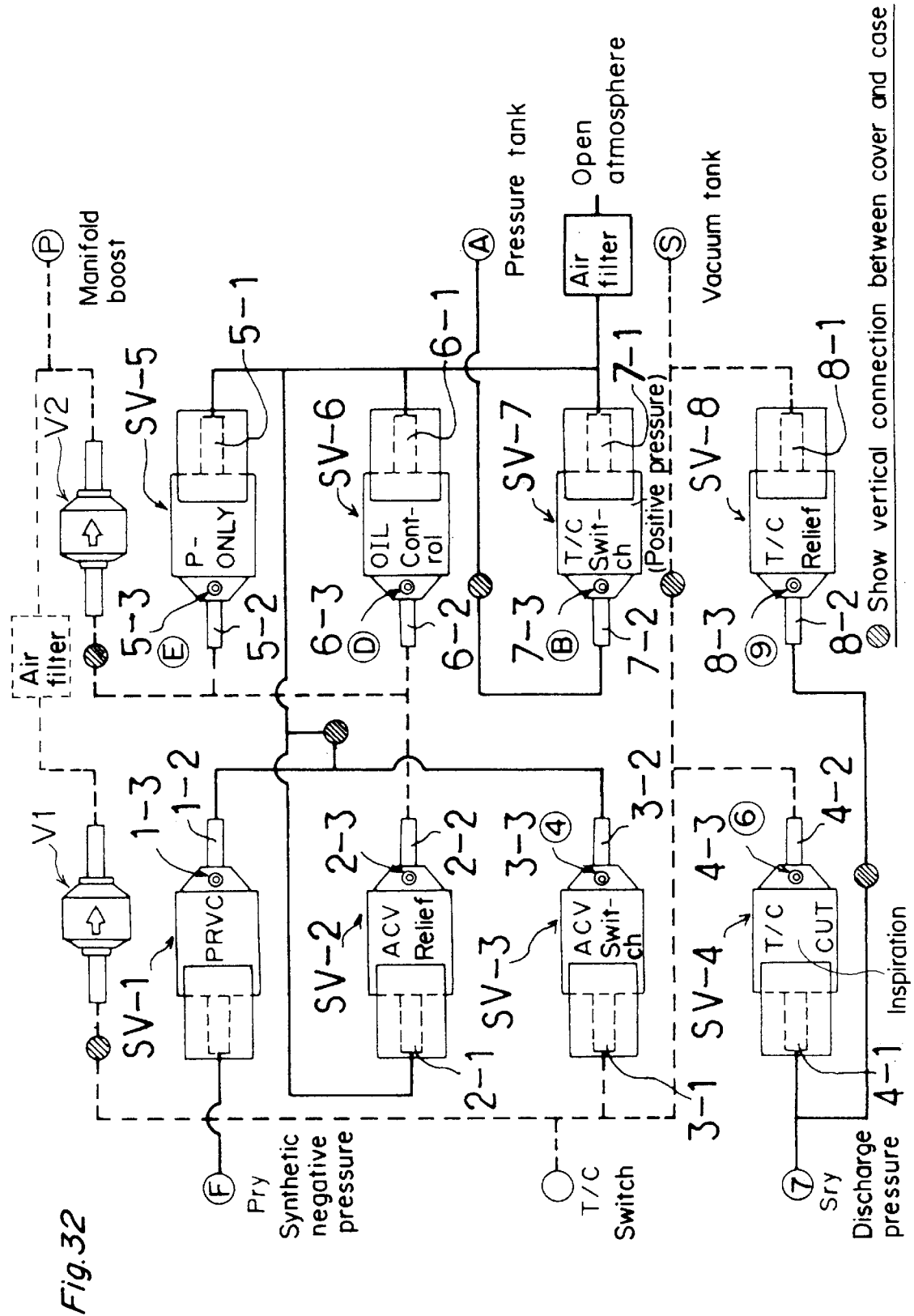
FIG. 32 is a system configuration diagram of an engine control assembly according to the present invention.
Figure 33:
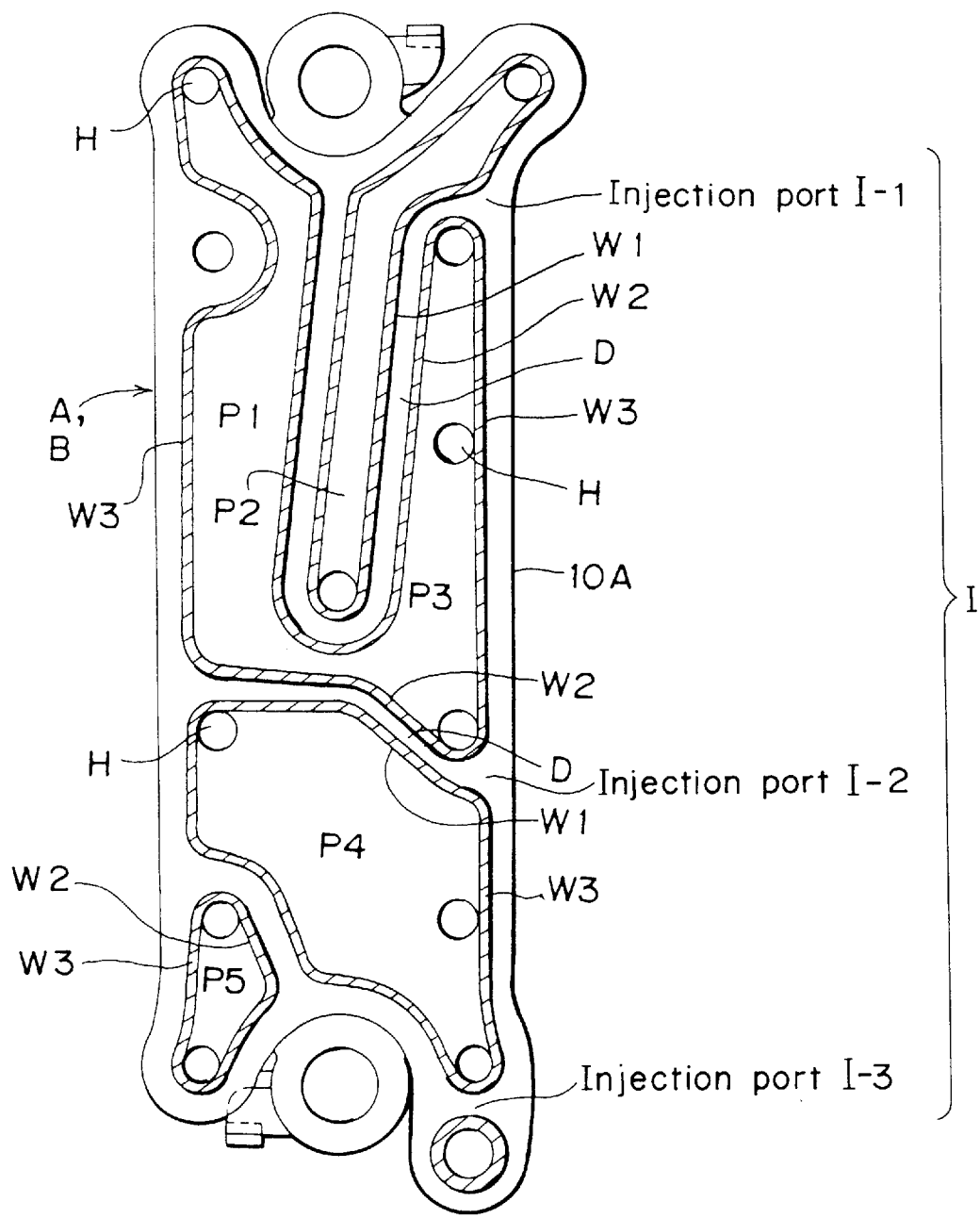
FIG. 33 is a plan view of the internal configuration of a housing according to the present invention.
Figure 35:
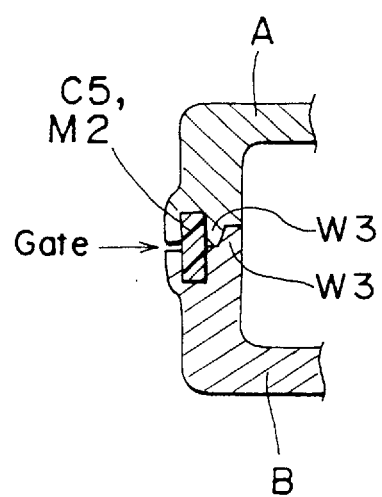
FIG. 35 is a cross section of an alternative method of bonding the circumference adhesion members of the molded bodies.

FIG. 1 is a perspective view of a channel housing comprising curving channels according to the present invention and assembled in a manner suited to an engine control assembly. FIG. 32 is a system configuration diagram of an engine control assembly according to the present invention.

Shown in FIG. 1 are the top channel housing 10, bottom channel housing 20, and right and left side channel housings 30 and 40. Eight three-way solenoid valves SV1–SV8, and two one-way valves V1 and V2 are assembled into the internal cavity enclosed by these four channel housings.

Figure 4:
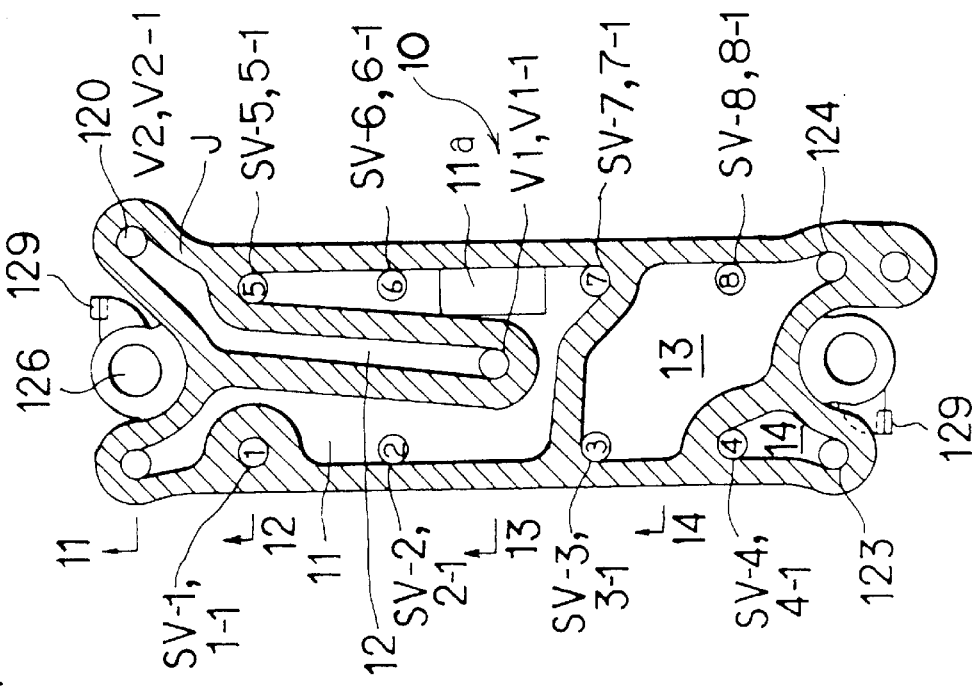
FIG. 4 is a plan view showing the channel configuration of the housing 10 connecting to the connecting pipes 1-1 to 8-1 projecting up from solenoid valves SV1–SV8 shown in FIG. 32.
Figure 5:
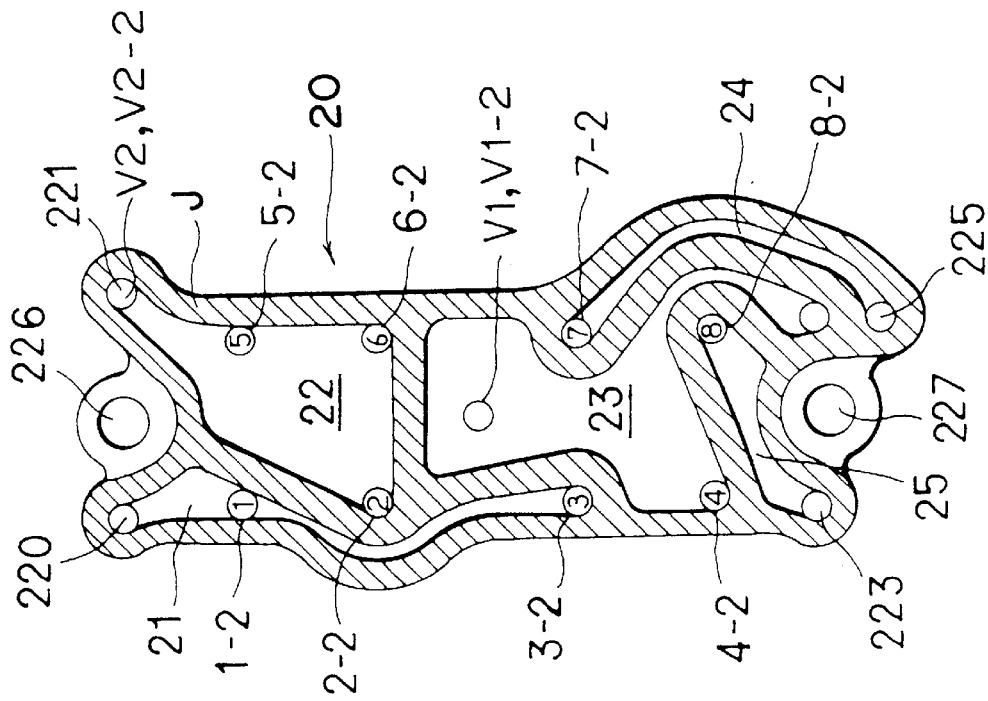
FIG. 5 is a plan view showing the channel configuration of the housing 20 connecting to the connecting pipes 1-2 to 8-2 projecting down from solenoid valves SV1–SV8 shown in FIG. 32.
Figure 6:
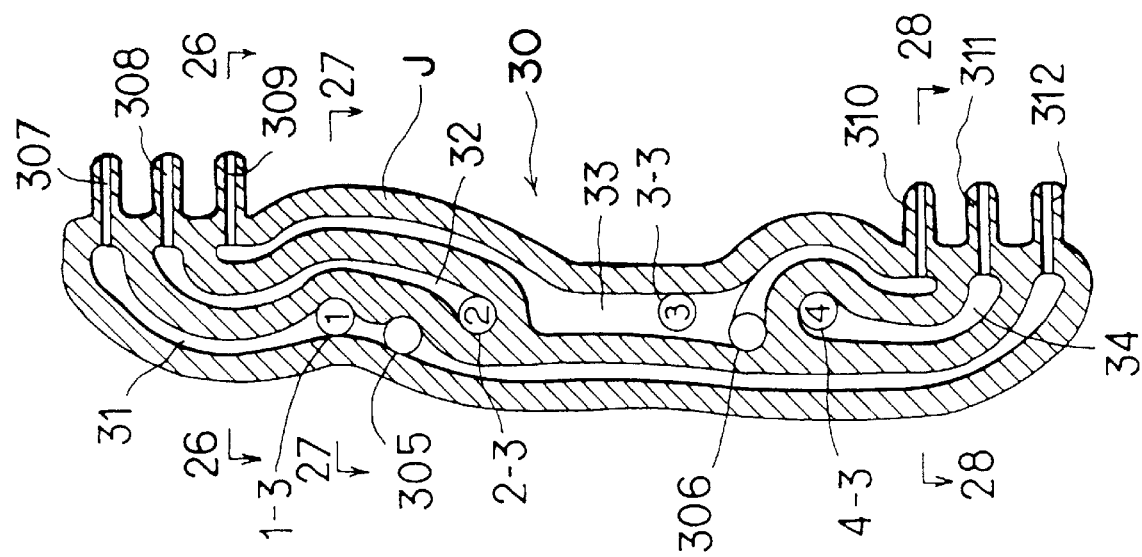
FIG. 6 is a plan view showing the channel configuration of the left side housing 30 connecting to the side connecting pipes of solenoid valves SV1–SV4 shown in FIG. 32.
Figure 7:
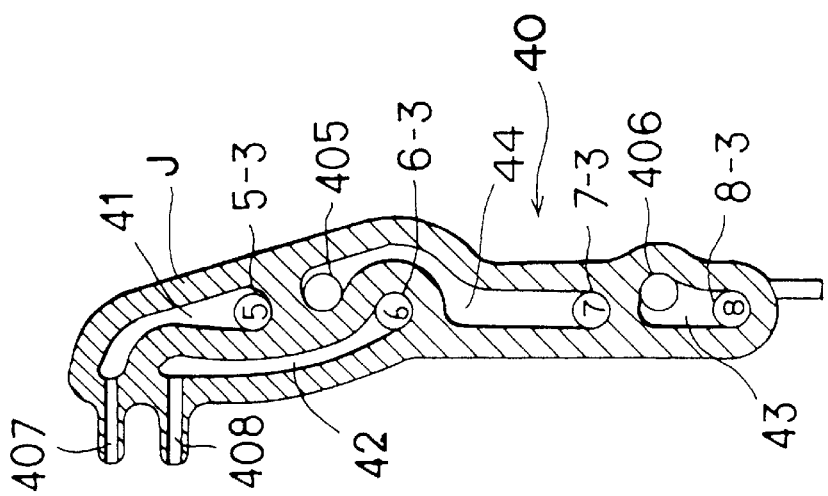
FIG. 7 is a plan view showing the channel configuration of the right side housing 40 connecting to the side connecting pipes of solenoid valves SV5–SV8 shown in FIG. 32.

FIG. 4 is a plan view showing the channel configuration of the channel housing 10 connecting to the connecting pipes 1-1 to 8-1, V1-1, and V2-1 projecting up from solenoid valves SV1–SV8 and one-way valves V1 and V2 shown in FIG. 32. FIG. 5 is a plan view showing the channel configuration of the channel housing 20 connecting to the connecting pipes 1-2 to 8-2, V1-2, and V2-2 projecting down from solenoid valves SV1–SV8 and one-way valves V1 and V2 shown in FIG. 32. FIG. 6 is a plan view showing the channel configuration of the left side housing 30 connecting to the side connecting pipes of solenoid valves SV1–SV4 shown in FIG. 32. FIG. 7 is a plan view showing the channel configuration of the right side housing 40 connecting to the side connecting pipes of solenoid valves SV5–SV8 shown in FIG. 32.

Figure 3:
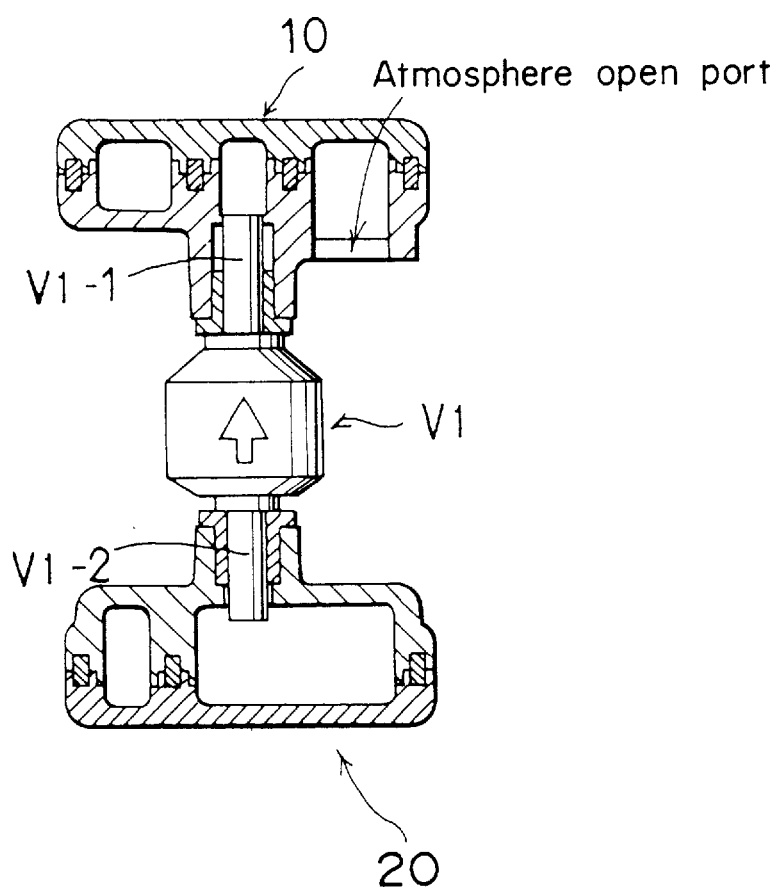

Specifically, the solenoid valves SV1–SV8 and the top channel housing 10 are connected as shown in FIGS. 4 and 32 with the top 1-1 of valve SV1 connected to the assist air supply port F. The tops 2-1, 5-1, 6-1, and 7-1 of valves SV2 and SV5, 6, and 7, respectively, are continuous through curving channel 11, and are open to the atmosphere through hole 11a and an air filter (not shown in the figures). The tops V1-1 and V2-1 of valves V1 and V2 are connected to manifold boost P via curving channel 12. The top connecting pipes 3-1 and 8-1 of valves SV3 and SV8 are connected to vacuum return S (FIG. 3) via curving channel 13 and bottom connecting tube 124. The top 4-1 of valve SV4 is connected to supply channel Sry from the turbocharger (not shown in the figures) via curving channel 14 and connecting tube 123.

To connect the solenoid valves SV1–SV8 to the bottom channel housing 20, the bottom ends 1-2 and 3-2 of valves SV1 and SV3 are connected to the curving channel 11 via curving channel 21 and connector port 220, and are similarly open to the atmosphere through an air filter. The bottom ends of valves SV2, SV5, and SV6 are connected to the manifold boost P through curving channel 22, connector port 221, and one-way valve V2. Valve SV4 is connected to one-way valve V1 through curving channel 23, and is connected to the manifold boost P. The bottom end of valve SV7 is connected to pressure tank A (FIG. 3) through curving channel 24 and connector port 225. The bottom end of valve SV8 is connected to supply channel Sry from the turbocharger (not shown in the figures) via curving channel 25 and connector port 223.

The connection of solenoid valves SV1–SV4 to the right side channel housing 30 is shown in FIGS. 6 and FIG. 32. Output line 1-3 of valve SV1 is connected to the fuel control valve PRCV through curving channel 31 and connecting tube 305. Solenoid valve SV2 is connected to the first supply path of the air control valve ACV through curving channel 32 and connecting tube 308. Output line 3-3 of valve SV3 is connected to the second supply path of the air control valve ACV through curving channel 33 and connecting tube 306. Output line 4-3 of valve SV4 is connected to the intake cut-off valve (not shown in the figures) disposed in the supply path of the turbocharger through curving channel 34 and connecting tube 311.

The connection of solenoid valves SV5–SV6 to the left side channel housing 40 is shown in FIG. 7 and FIG. 32. Output line 5-3 of valve SV5 is connected to a switching valve (not shown in the figures) connected to the first supply path from the intercooler IC to the rotary engine RE via curving channel 41 and connecting tube 407. Output line 6-3 of valve SV6 is connected to the oil control valve (not shown in the figures) of the rotary engine RE via curving channel 42 and connecting tube 408. Output line 7-3 of valve SV7 is connected to the switching valve (not shown in the figures) of the waste gas supply circuit to the second turbocharger T/C via curving channel 44 and connecting tube 405. Output line 8-3 of valve SV8 is connected to the relief valve (not shown in the figures) provided in the pressure relief circuit continuous to the air cleaner, branching from the supply circuit of the second turbocharger T/C via curving channel 43 and connecting tube 406.

The operation of an engine control assembly thus comprised is described in detail in Japanese Patent Ser. No. 5-349806, and the detailed description thereof is thus omitted below.

The method of manufacturing a channel housing as described above is described below.

The channel housings described above each comprise an outside plate A and an inside plate B, and are manufactured in a two step molding method. In the first step, the outside plate A and inside plate B are separately molded from a first resin M1 (A). In the second step, the outside plate A and inside plate B are combined (B), and the partitions W partitioning the curving channels therein are then bonded with a secondary resin M2 (C).

More specifically, a pair of molded bodies A and B are molded from a first resin M1 in a first molding process as shown in FIG. 34(A). In the second process (butt joining), the paired channel members form continuous adhesive cavities C1–C4, which are open to circumference adhesion members C5 and C6 of the butt-joined pair of molded bodies and comprise a secondary resin injection port I (FIG. 34(B)). Finally, a secondary resin M2 supplied from a runner simultaneously to circumference adhesion members C5 and C6 is injected from gate G continuous to the injection ports I into the adhesive cavities C1–C4 in the final integration process to bond the molded bodies 10A and 10B (FIG. 34(C)).

This method is described more specifically below. As shown in FIG. 8, the outside plate 10A of the top channel housing 10 has a single channel 101 formed in the top along the middle of partition W. Small gas escape holes 108 are provided at a predetermined spacing; four projecting outside connecting pipes 102–105 and two outside connector ports 106 and 107 are also formed. On the bottom of the outside plate 10A, the perimeter edges of the partitions W are removed to form a double shoulder Wa along the outside edges of the partitions W (see FIG. 10).

Figure 10:
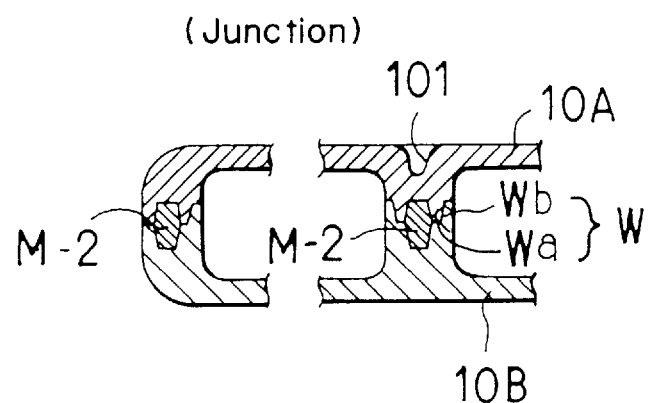
FIG. 10 is a cross section of the bonding state of the channel housing.
Figure 11:
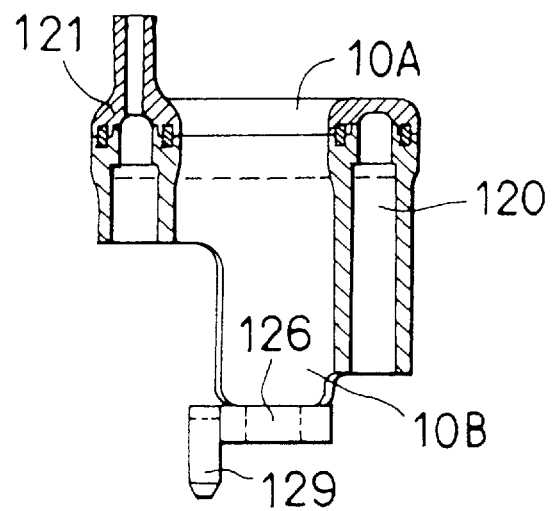
FIGS. 11–14 are cross sections at lines 11—11, 12—12, 13—13, and 14—14, respectively, of the top channel housing 10 shown in FIG. 4.
Figure 12:
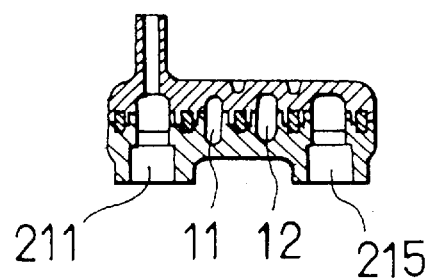
Figure 13:
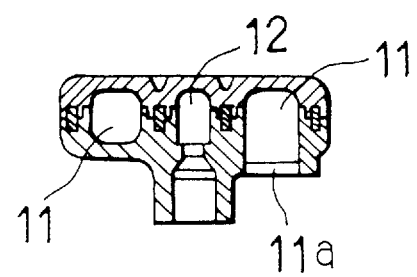
Figure 14:
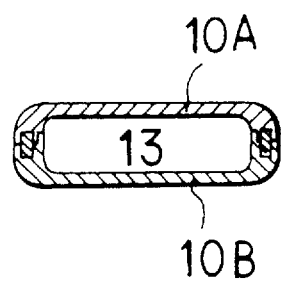

Double stepped shoulders Wb conforming to the double shoulders Wa in the outside plate 10A are formed in the top of the inside plate 10B as also shown in FIG. 10. In the bottom of the inside plate 10B are formed the connector ports 111–116, 118 and 119 for connecting to the eight input connecting pipes 1-1 to 8-1 of the solenoid valves SV1–SV8; connecting pipes 120 and 122–125 for connecting to the four outside connecting pipes 102–105; and connecting pipes 121 for connecting the curving channel 11 to the bottom channel housing 20. Also shown are installation holes 126 and 127, and a mating claw 128 for engaging the bottom channel housing 20 at a point on the circumference diagonally opposed to the installation holes 126 and 127.

When the outside plate 10A and inside plate 10B are placed together, and the inside shoulders Wa are fit into the outside shoulders Wb, cavities 130 for injecting the adhesive resin are formed along the partitions W. It is to be noted that the circumference partition is simply butt joined in one part, but the other parts are first meshed together before being bonded.

Figure 15:
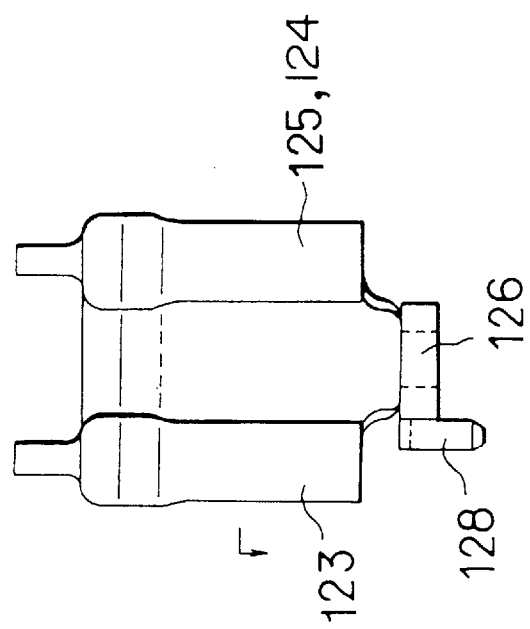
FIGS. 15 and 16 are side and front views, respectively, of the top channel housing 10 shown in FIG. 4.
Figure 16:
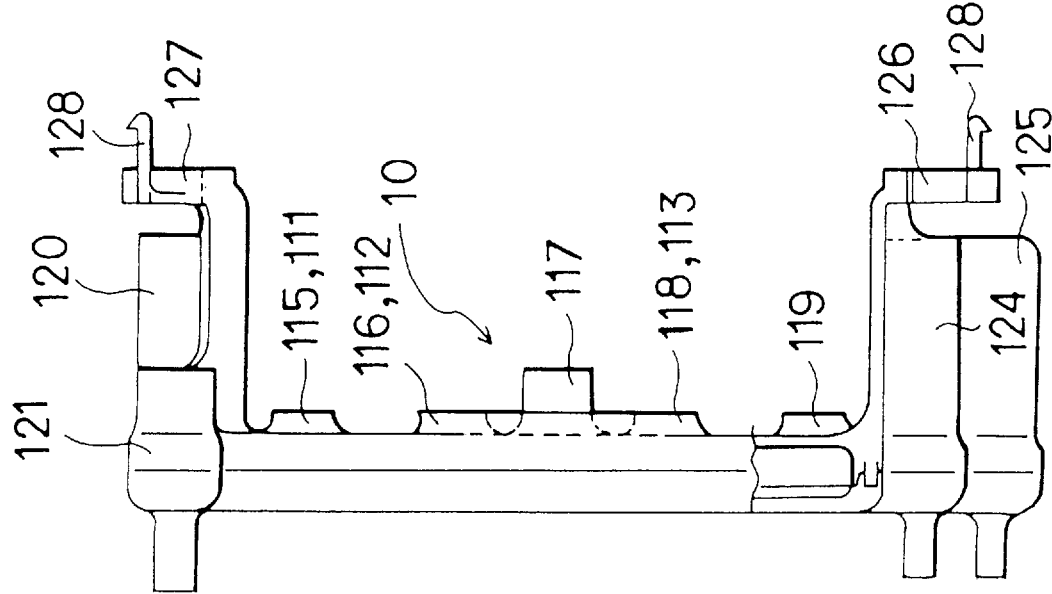
Figure 19:
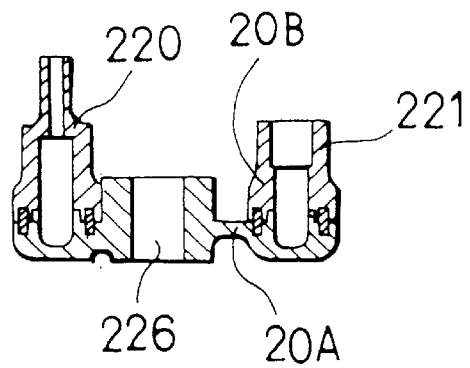
FIGS. 19–22 are cross sections at lines 19—19, 20—20, 21—21, and 22—22, respectively, of the bottom channel housing 20 shown in FIG. 5.
Figure 20:
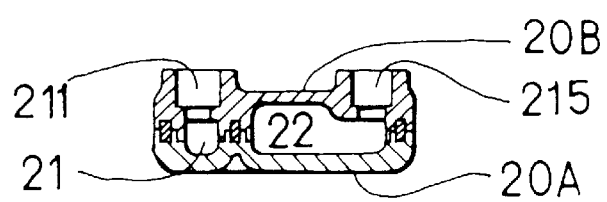
Figure 21:
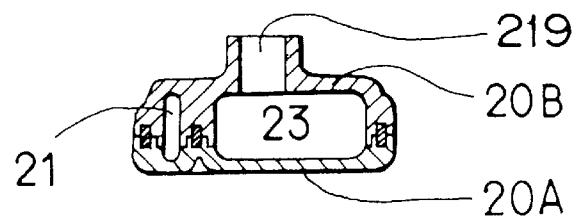
Figure 22:
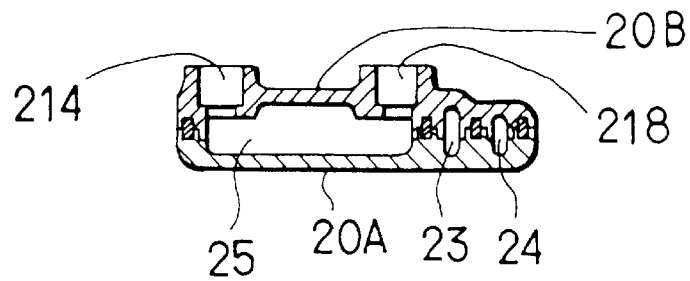

When the adhesive resin is then injected to the cavities 130 from around the outside plate 10A and inside plate 10B, the cavities 130 become filled with the secondary resin M2 and the resin also travels around the perimeter, thus bonding the outside plate 10A and the inside plate 10B together, and thereby forming the top channel housing 10. FIGS. 11–14 are cross sections at lines 11—11, 12—12, 13—13, and 14—14, respectively, of the top channel housing 10 shown in FIG. 4, and FIGS. 15 and 16 are side and front views, respectively.

The bottom channel housing 20 similarly comprises an outside plate 20A and an inside plate 20B, and is structured and bonded similarly to the top channel housing 10. More specifically, as shown in FIG. 17, a single channel 201 formed in the bottom of the outside plate along the middle of partition W, and small gas escape holes 208 are provided at a predetermined spacing. In the bottom of the inside plate 20B shown in FIG. 18, the connector ports 211–218 for connecting to the eight input connecting pipes 1-2 to 8-2 of the solenoid valves SV1–SV8; and connecting pipes 220–225 for connecting to the outside connecting pipes 112–116 from the top channel housing 10, are formed. Also shown are installation holes 226 and 227, and a mating hole 228 for engaging the mating claw 128 of the top channel housing 10 at a point on the circumference diagonally opposed to the installation hole 217.

Figure 23:
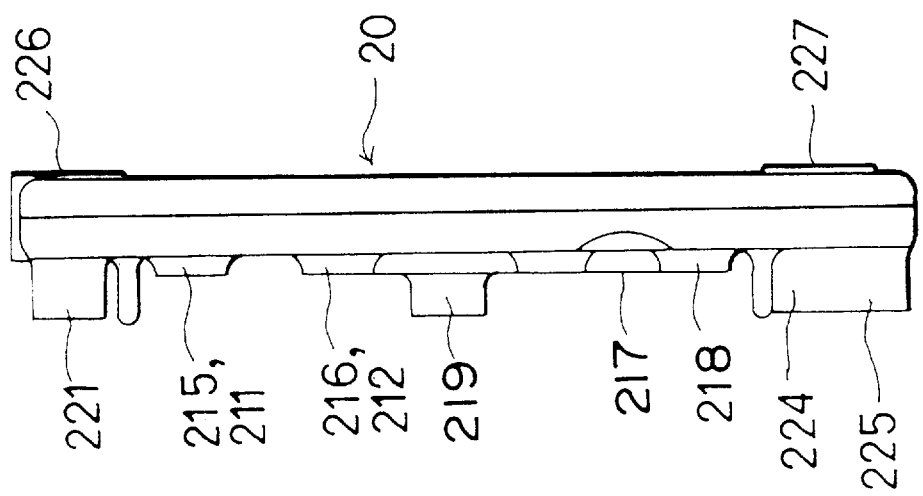
FIG. 23 is a front view of the bottom channel housing 20 shown in FIG. 5.
Figure 24:
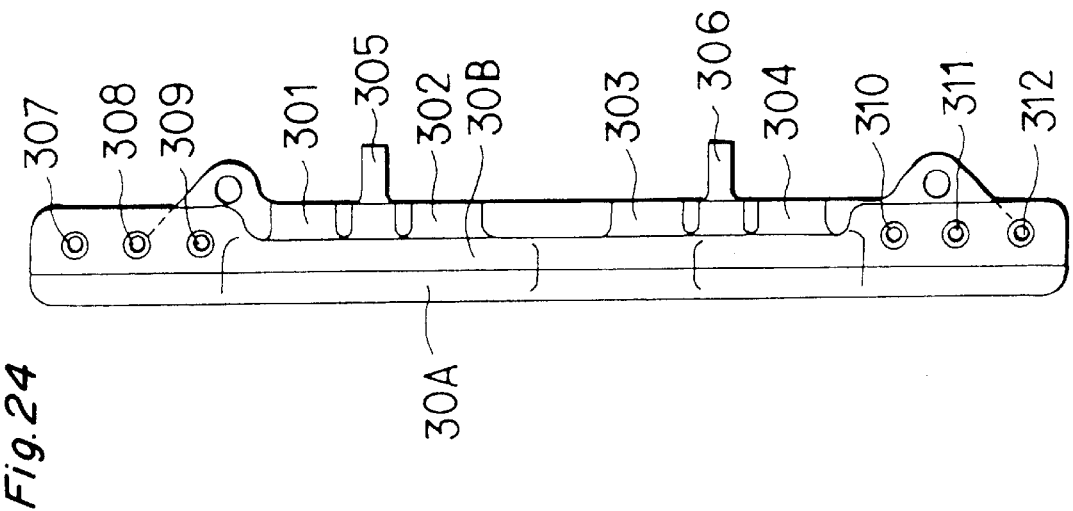
FIG. 24 is a top view of the left side channel housing 30 shown in FIG. 6.
Figure 25:
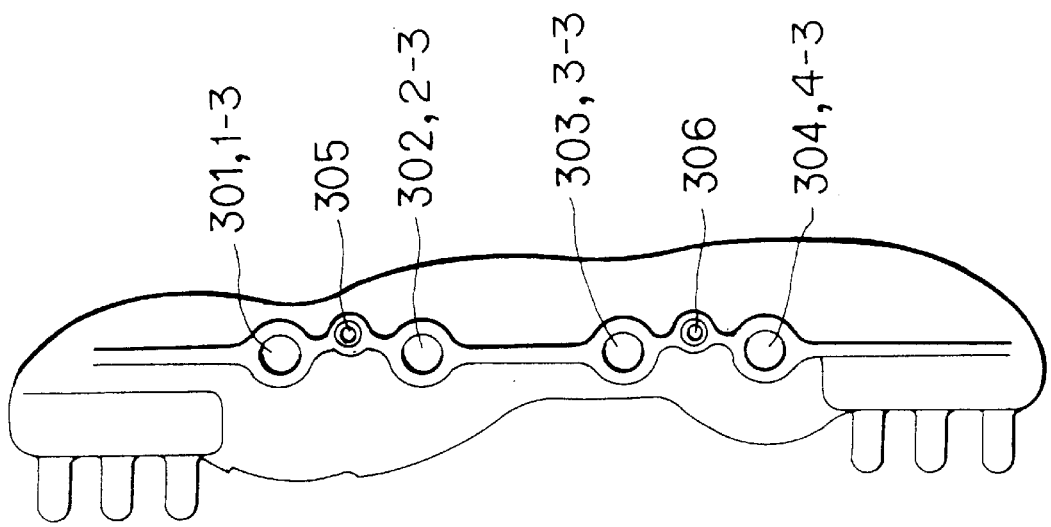
FIG. 25 is an internal side view of the left side channel housing 30 shown in FIG. 6.

FIGS. 19–22 are cross sections at lines 19—19, 20—20, 21—21, and 22—22, respectively, of the bottom channel housing 20 shown in FIG. 5, and FIG. 23 is a front view.

The right side channel housing 30 similarly comprises an outside plate 30A and an inside plate 30B, and is structured and bonded similarly to the top channel housing 10. This outside plate 30A, however, is flat. The inside plate 30B, comprises six output pipes 307–312 projecting up; connector ports 301–304 for connecting with the output connecting pipes 1-3 to 4-3 of solenoid valves SV1–SV4; and two projecting output pipes 305 and 306. See FIGS. 24–28.

Figure 26:
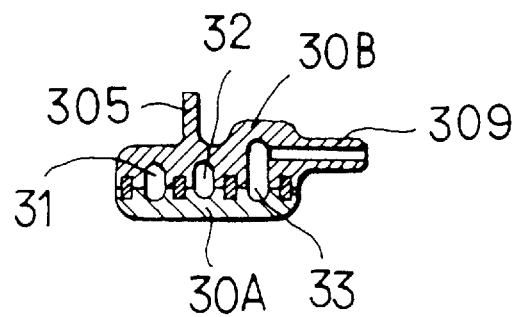
FIGS. 26–28 are cross sections at lines 26—26, 27—27, and 28—28, respectively, of the left side channel housing 30 shown in FIG. 6.
Figure 27:
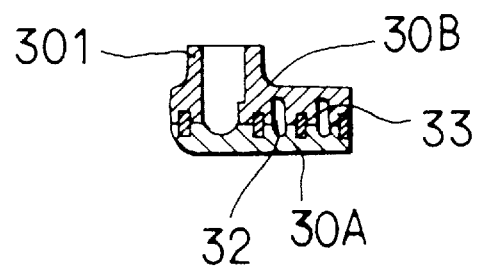
Figure 28:
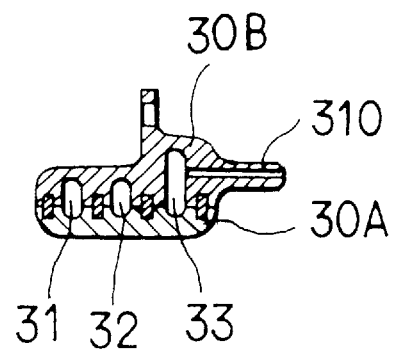
Figure 29:
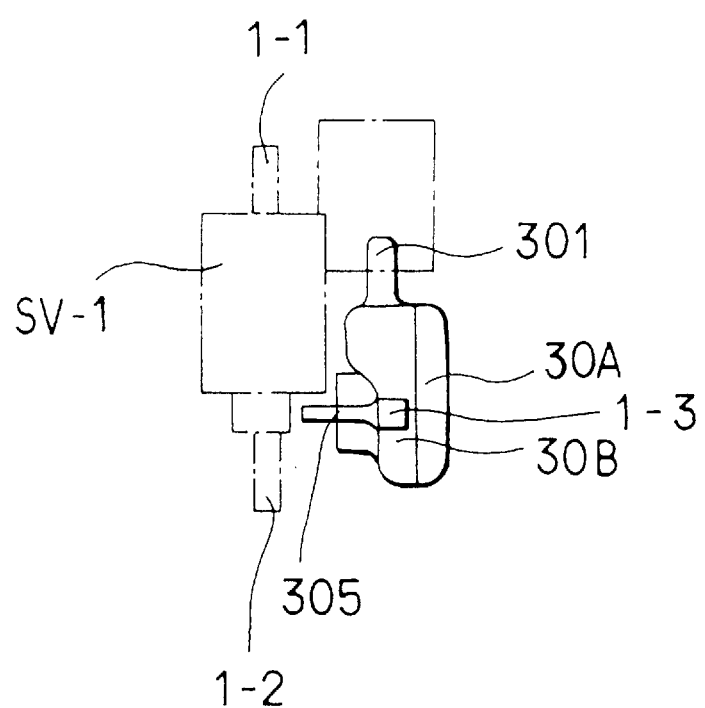
FIG. 29 is an end view showing the connection of the side channel housing to the solenoid valve SV.

FIGS. 26–28 are cross sections at lines 26—26, 27—27, and 28—28, respectively, of the left side channel housing 30 shown in FIG. 6.

The left side channel housing 40 similarly comprises an outside plate 40A and an inside plate 40B as shown in FIGS. 30 and 31, and is structured and bonded similarly to the right side channel housing 30. Two projecting output pipes 407 and 408 are disposed on inside plate 40B, which insidely comprises connector ports 401–404 for connecting with the output connecting pipes 5-3 to 8-3 of solenoid valves SV5–SV8, and two output pipes 405 and 406.

It is preferable to use the method and apparatus for testing the airtightness of the above engine control assembly described in Japanese Patent Ser. No. 6-9179. This method and apparatus make it possible to automatically test complicated circuits with high precision. This reference patent application is incorporated into the present application by this specific reference thereto.

What is claimed is:

1. A box-like channel housing provided with a plurality of internal curved channels for conducting a fluid internally, comprising:

first and second abutting molded bodies forming the box-like housing;

each of the molded bodies having an open inner surface comprising a longitudinally split channel configuration that is defined by a wall member extending substantially perpendicularly from the inner surface and corresponds to a longitudinally split channel configuration on the other of the bodies, whereby the internal curved channels are defined by the abutting longitudinally split channel configurations of the two molded bodies; and at least one member selected from the group consisting of a connecting part and a connection port communicating the exterior of the housing with the curved channels.

2. The channel housing according to claim 1, wherein the molded bodies define a circumferential adhesion channel having a cross-sectional shape that is one selected from the group consisting of a C-shape cross-section and an O-shape cross-section.

3. A box-like channel housing provided with a plurality of internal curved channels for conducting a fluid internally, comprising:

first and second abutting molded bodies forming the box-like housing;

each of the molded bodies having an open inner surface comprising a longitudinally split channel configuration that corresponds to a longitudinally split channel configuration on the other of the bodies, whereby the internal curved channels are defined by the abutting longitudinally split channel configurations of the two molded bodies; and at least one member selected from the group consisting of a connecting part and a connection port communicating the exterior of the housing with the curved channels, wherein the longitudinally split channel configurations are defined by bonding walls that extend substantially perpendicularly from the inside surfaces of the molded bodies and define a plurality of mutually opposed closed curve loops, the opposed bonding walls having edges that are bonded together, whereby curved channels in the housing are defined by pairs of the mutually opposed closed curve loops.

4. The channel housing according to claim 3, wherein the bonding walls further comprise a channel member to form a second channel filled with adhesive resin for bonding the pair of molded bodies together.

5. A box-like channel housing provided with a plurality of internal curved channels for conducting a fluid internally, comprising:

first and second abutting molded bodies forming the box-like housing;

each of the molded bodies having an open inner surface comprising a longitudinally split channel configuration that corresponds to a longitudinally split channel configuration on the other of the bodies, whereby the internal curved channels are defined by the abutting longitudinally split channel configurations of the two molded bodies; and at least one member selected from the group consisting of a connecting part and a connection port communicating the exterior of the housing with the curved channels, wherein the longitudinally split channel configurations are defined by partition walls that extend substantially perpendicularly from the inside surfaces of the molded bodies and define a plurality of mutually opposed closed curve loops, the opposed partition walls having edges that are in contact with each other, whereby curved channels in the housing are defined by pairs of the mutually opposed closed curve loops.

6. The channel housing according to claim 5, wherein a second channel for adhesive resin is defined between the partition walls of adjacent closed curve loops.

7. The channel housing according to claim 6, wherein the partition walls defining the second channel have a step-like bonding edge to prevent adhesive resin from spilling out from the second channel member when the adhesive resin is injected thereinto.

* * * * *